3,053,778
**POLYURETHANE FOAM RESISTANT TO DIS-
COLORATION AND PROCESS FOR MAKING
SAME**
Gilbert C. Toone, Hamburg, N.Y., assignor to Allied
 Chemical Corporation, New York, N.Y., a corporation
 of New York
No Drawing. Filed Dec. 9, 1959, Ser. No. 858,319
4 Claims. (Cl. 260—2.5)

This invention relates to polyurethanes and more particularly refers to new and improved polyurethane flexible foam products obtained by reaction of an organic polyisocyanate with an organic compound having reactive hydrogen atoms.

Cellular plastic materials having a wide variety of uses are well known in the art. Polyurethane compositions suitable for the production of foams are prepared by the reaction of polyisocyanates with organic compounds containing a plurality of reactive hydrogen atoms in the presence or absence of water, catalysts, emulsifiers and other additives. The production of cellular polyurethane materials is illustrated in various patents, e.g. U.S. 2,591,884; 2,726,219; 2,764,565 and 2,787,601. Many of the foams manufactured by these procedures undergo extensive discoloration on aging and/or exposure to sunlight. Such discoloration is a serious disadvantage preventing the use of polyurethane foam products for many applications for which such cellular materials are most suitable. The cause of this discoloration is unknown and such discoloration is most marked in flexible foam products which have been exposed to light.

An object of the present invention is the production of flexible polyurethane cellular materials that have a reduced tendency to undergo discoloration on aging and/or exposure to light, e.g. sunlight.

My invention relates to a novel method for reducing the tendency of polyurethane foams from aromatic polyisocyanates to discolor on aging and/or exposure to sunlight. In particular, the invention concerns the incorporation of a water-soluble alkali metal and ammonium salts of sulfite, bisulfite, hydrosulfite, or thiosulfate in the aqueous mixture used to produce the polyurethane foam. The foams produced in this manner possess a fine and uniform cellular structure, good physical properties, and resist discoloration.

The present invention is particularly effective for retarding the discoloration by aging and/or exposure to light of urethane foams produced from aromatic polyisocyanates, especially phenylene diisocyanates and their nuclear monoalkyl- and monochloro substitution products, and particularly 2,4-toluene diisocyanate and mixtures of the 2,4-isomer and 2,6-isomer in which the 2,4-isomer is the major constituent. However, other diisocyanates or mixtures can be employed in which case the discoloration tendencies of the polyurethane foam may be less severe.

In the usual manner for preparing polyurethane foams, the organic diisocyanate, polyol (i.e. a polyester, polyether having predominantly terminal hydroxyl groups or a monobasic fatty acid triglyceride having a hydroxyl number of about at least 50, such as castor oil) and water are reacted in the presence of suitable catalysts, dispersing agents, etc., to form a foam. In general, the polyols and diisocyanate are reacted to form a prepolymer which is then mixed with water, catalyst, etc. to produce a foamable mass, though "one-shot" formations can be used. The present invention is not concerned with the method of producing the polyurethane foam which is disclosed in the prior art as illustrated by U.S. Patents 2,591,884; 2,726,219; 2,764,565 and 2,787,601; but is directed to the use of alkali metal sulfites, bisulfites, hydrosulfites or thiosulfates for reducing the tendency of such foams to discolor on aging or exposure to light. The discoloration agents of the present invention are a water-soluble alkali metal sulfite, bisulfite, hydrosulfite or thiosulfate such as sodium sulfite, sodium bisulfite, ammonium bisulfite, sodium hydrosulfite, sodium thiosulfate, etc. These are recognized as belonging to the class of salts of oxyacids of sulfur having reducing properties. The term water-soluble alkali metal salts includes ammonium salts as well as quaternary ammonium salts derived from suitable amines, the sodium salts being preferred. The amount of sulfite, bisulfite, hydrosulfite or thiosulfate required to reduce or inhibit the discoloration of the polyurethane foam is as low as 0.1% based on the total weight of reactants, though amounts as high as 5% may be used. There is little advantage to be obtained by the employment of the larger quantities, and preferably the amount of sodium salt utilized is from 0.5% to 1% based on the total weight of ingredients. The discoloration agent may be easily and conveniently incorporated in the polyurethane foamable composition by admixing it in the form of an aqueous solution or admixing it with the aqueous catalyst mixture.

The more detailed practice of the invention is illustrated by the following examples, in which parts given are by weight and temperature in degrees centigrade.

*Example 1*

A premix was prepared by reacting 100 parts of diethylene glycol adipate polyester (molecular weight 1800–2000, acid number about 2 and hydroxyl number 65–70) with 39 parts of isomeric toluene diisocyanates ("Nacconate" 80, 80% 2,4-isomer and 20% 2,6-isomer) under an atmosphere of $CO_2$ (or other inert gas such as $N_2$) at room temperature for about ½ hour. This premix is not stable and in general is prepared in quantities only sufficient for immediate use. To the premix there was added, with rapid stirring, 4.8 parts of aqueous catalyst mixture (2.5 parts water, 1.3 parts N-methyl morpholine and 1 part dispersing agent, "Witco" 77–86, a blend of polyalcohol carboxylic acid esters and oil-soluble sulfonates). The mixing was completed in about 20 seconds and the foaming reaction mass was allowed to expand fully. The foam was cured at room temperature.

Similar foams were obtained from diethylene glycol adipate (100 parts) and toluene diisocyanate isomer mixture ("Nacconate" 80, 39 parts) employing an aqueous catalyst mixture containing, in addition to dispersing agent and tertiary amine catalyst, sodium thiosulfate in amounts varying from 1 to 5 parts.

Samples of the cured foams were exposed to light in a north window at room temperature to observe the discoloration occurring on aging and exposure to light.

| Sample | Color After 9 Days' Exposure | Color After 2 Months' Exposure |
|---|---|---|
| Control | brownish yellow | yellow brown. |
| 1 part $Na_2S_2O_3$ | pale cream | pale yellow. |
| 2.6 parts $Na_2S_2O_3$ | ____do____ | Do. |
| 5 parts $Na_2S_2O_3$ | ____do____ | Do. |

Employing the diethylene glycol adipate-toluene diisocyanate premix of Example 1 above, a series of foams were produced using an aqueous catalyst mixture containing varying amounts of sodium bisulfite dissolved therein.

Samples of these foams were exposed to sunlight at room temperature and atmospheric pressure to determine the effect of sodium bisulfite additive on discoloration.

| Sample | Color After 22 Days' Exposure | Color After 40 Days' Exposure |
|---|---|---|
| Control | yellow brown | brown. |
| 0.5 part NaHSO₃ | cream | deep cream. |
| 1.0 part NaHSO₃ | ----do---- | Do. |
| 2.0 parts NaHSO₃ | ----do---- | Do. |

All foams were sliced through after 40 days' exposure, the control sample was discolored to a depth of from ½ to 1 inch, whereas the samples containing sodium bisulfite were white in the interior, the slight discoloration being restricted to the surface.

*Example 3*

A typical polyether prepolymer was prepared by the reaction of a polypropylene glycol ("Niax" Diol 2025, Union Carbide Corp., av. mol wt. 2025) and toluene diisocyanate ("Nacconate" 80, 80% 2,4-isomer, 20% 2,6-isomer). A flexible cellular material is produced by mixing with 100 parts of this prepolymer, an aqueous emulsion consisting of water (3 parts), tertiary amine catalyst (N-methyl morpholine, 3 parts), and a dispersing agent (Silicone fluid DC-200 (50), 0.5 part). Foams were also prepared in the same manner employing an aqueous catalyst emulsion containing sodium bisulfite. The cured products were exposed to sunlight.

| Sample | Color After 2 Days' Exposure | Color After 18 Days' Exposure |
|---|---|---|
| Control | yellow | deep yellow brown. |
| 1.0 part NaHSO₃ | white | deep cream. |
| 2.0 parts NAHSO₃ | ----do---- | Do. |

Although certain preferred embodiments of the invention have been disclosed for purpose of illustration, it will be evident that various changes and modifications may be made therein without departing from the scope and spirit of the invention.

I claim:

1. In a process for the production of polyurethane foam involving the reaction of an organic polyisocyanate with a polyol selected from the group consisting of a polyester and a polyether having predominantly terminal hydroxyl groups and a monobasic fatty acid triglyceride having a hydroxyl number of at least 50, the improvement which comprises incorporating in the reactants prior to foam formation about 0.1% to 5% by weight of a discoloration agent which is a water-soluble salt in which the anion is selected from the group consisting of sulfite, bisulfite, hydrosulfite and thiosulfate and in which the cation is selected from the group consisting of alkali metal and ammonium to retard discoloration of the polyurethane foam.

2. In a process for the production of polyurethane foam involving the reaction of an aromatic polyisocyanate with a polyol selected from the group consisting of a polyester and a polyether having predominantly terminal hydroxyl groups and a monobasic fatty acid triglyceride having a hydroxyl number of at least 50, the improvement which comprises incorporating in the reactants prior to foam formation about 0.1% to 5% by weight of sodium bisulfite to retard discoloration of the polyurethane foam.

3. In a process for the production of polyurethane foam involving the reaction of an organic polyisocyanate with a polyol selected from the group consisting of a polyester and a polyether having predominantly terminal hydroxyl groups and a monobasic fatty acid triglyceride having a hydroxyl number of at least 50, the improvement which comprises incorporating in the reactants prior to foam formation about 0.5% to 1% by weight of sodium thiosulfate to retard discoloration of the polyurethane foam.

4. A discoloration-resistant polyurethane foam resulting from the reaction of an organic polyisocyanate with a polyol selected from the group consisting of a polyester and a polyether having predominantly terminal hydroxyl groups and a monobasic fatty acid triglyceride having a hydroxyl number of at least 50, containing as an inhibitor of discoloration incorporated in the reactants prior to foam formation about 0.1% to 5% by weight of a water-soluble salt in which the anion is selected from the group consisting of sulfite, bisulfite, hydrosulfite and thiosulfate and in which the cation is selected from the group consisting of alkali metal and ammonium.

References Cited in the file of this patent

UNITED STATES PATENTS

| | | |
|---|---|---|
| 2,227,985 | Swann | Jan. 7, 1941 |
| 2,764,565 | Hoppe et al. | Sept. 25, 1956 |
| 2,779,689 | Reis | Jan. 29, 1957 |
| 2,990,378 | Hurwitz et al. | June 27, 1961 |